United States Patent [19]

Degen et al.

[11] Patent Number: 5,271,842

[45] Date of Patent: Dec. 21, 1993

[54] CONTAMINANT REMOVAL SYSTEM AND PROCESS

[75] Inventors: Peter J. Degen; Jeffrey K. Chambers, both of Huntington; John R. Gerringer, Port Washington, all of N.Y.

[73] Assignee: Pall Corporation, Glen Cove, N.Y.

[21] Appl. No.: 804,413

[22] Filed: Dec. 10, 1991

[51] Int. Cl.$^5$ ............................................. B01D 61/00
[52] U.S. Cl. ...................... 210/649; 210/634; 210/500.36; 210/295; 210/689; 428/323; 96/4
[58] Field of Search ............... 210/650, 653, 654, 189, 210/282, 283, 295, 166, 649, 500.36, 294, 89, 649, 634; 55/16, 75; 521/53; 204/159.15; 428/323, 246

[56] References Cited

U.S. PATENT DOCUMENTS

| | | |
|---|---|---|
| 4,045,352 | 8/1977 | Rembaum et al. |
| 4,199,455 | 4/1980 | Chiang et al. |
| 4,506,035 | 3/1985 | Barnett et al. ........................ 521/53 |
| 4,588,500 | 5/1986 | Sprenger et al. ..................... 210/100 |
| 4,686,776 | 8/1987 | Matsubara . |
| 4,780,211 | 10/1988 | Lien ...................................... 210/654 |
| 4,830,643 | 5/1989 | Sassa et al. ............................ 55/316 |
| 5,041,225 | 8/1991 | Norman ........................... 210/500.36 |
| 5,084,168 | 1/1992 | Woog ................................... 210/266 |
| 5,089,119 | 2/1992 | Day et al. ................................ 55/75 |
| 5,110,479 | 5/1992 | Frommer et al. ................... 210/282 |
| 5,130,024 | 7/1992 | Fujimoto et al. .............. 210/500.36 |

Primary Examiner—Robert A. Dawson
Assistant Examiner—Ana M. Fortuna
Attorney, Agent, or Firm—Leydig, Voit & Mayer

[57] ABSTRACT

A system and method for removing contaminants in a fluid, particularly water from lubricating oil, is provided which may comprise a particulate zeolitic adsorbent in conjunction with a non-porous PTFE barrier that has been modified to be permeable to water and impermeable to oil. Such a system is capable of reducing the level of water in lubricating oil to less than 100 parts per million.

29 Claims, No Drawings

CONTAMINANT REMOVAL SYSTEM AND PROCESS

FIELD OF THE INVENTION

This invention pertains to a system and process for removing contaminants from a fluid environment. More particularly, this invention relates to a fluid clarification system and process for the removal of contaminants from a bulk fluid.

BACKGROUND OF THE INVENTION

Aerospace lubricating fluids require the removal of contaminants by a system that is operable under harsh working conditions, e.g., such a system must be capable of withstanding extremes of temperature and sudden changes in pressure differential. In addition, a fluid clarification system for aerospace lubricating fluids must make efficient use of volume and weight, due to the economic and physical constraints associated with flight.

For example, aircraft power generators, commonly referred to as integrated drive generators, and aerospace hydraulic systems utilize oils for lubrication and motive power under highly demanding conditions. Lubricating oils include various forms of petroleum distillates, synthetic oils, shale and coal derived oils. Synthetic oils, e.g. ester, phosphate, silicone, glycol or polyphenyl ether based oil, are frequently utilized as lubricants where extreme operating conditions are encountered. Synthetic oils, particularly ester based oils, are frequently employed as lubricants in aerospace integrated drive generators where elevated temperatures and severe load conditions dictate the use of an oil capable of withstanding extended exposure to elevated temperatures. Ester based synthetic oils, for example, exhibit very high viscosity, high flash points, low volatility, and exceptionally low pour points compared with petroleum based oils, making them especially suitable for use in integrated drive generators. Aerospace hydraulic systems, where severe load conditions are encountered, often utilize phosphate based synthetic oils, wherein the oil acts as both the hydraulic fluid and the hydraulic system lubricant.

Lubricating oils used in such applications are frequently contaminated with water. Typically, it is such contamination that initiates corrosion processes, which lead to the breakdown of metal components unless controlled. For example, under the operating conditions of integrated drive generators, typically up to about 250° F., water reacts with lubricating oils to chemically degrade the oil and increase corrosion rates of internal metal components. Water also hydrolyzes ester based synthetic oils forming alcohol and acid, which in turn lead to increased rates of corrosion.

The current solution to this critical safety problem is the implementation of frequent, and expensive, maintenance. Thus, time consuming, expensive, scheduled maintenance has become a necessity in maintaining these systems.

It is known that reducing the concentration of water in lubricating oils inhibits these chemical reactions, which reduces corrosion, thereby increasing the life of the mechanical parts, and increasing the time between oil changes. When the level of water is reduced to a low level, corrosion is inhibited, significantly extending the period for scheduled oil changes. The complete elimination of water from such lubricating systems inhibits corrosion completely.

No good solution to this problem has previously been available, indeed, it has been difficult to design a system which can remove liquid contaminants present in concentrations lower than about 500 parts per million (ppm) from a fluid environment in a simple, efficient, and cost effective manner. (As used herein, all parts per million are by weight.) For example, coalescing is an effective method for the removal of water from oils; however, coalescing is limited to the removal of only dispersed water and does not have the ability to remove dissolved water. Many lubricating oils can contain high levels of dissolved water which produce high rates of corrosion of the system components. Even at levels of about 1500 ppm, dissolved water in synthetic lubricating oils leads to an increased rate of corrosion. As the level of water falls below 500 ppm, the corrosion rate is reduced; and the corrosion rate is reduced significantly as the water level approaches 300 to 200 ppm. Accordingly, it is desirable to develop a system which can efficiently reduce the level of contaminants present in lubricating fluids to about 200 ppm or lower.

Systems designed for airborne use, as well as certain other applications, must also combine a high level of effectiveness with relatively light weight and a limited volume, i.e., a critical factor in the removal of contaminants from lubricating oils used in aerospace applications is the limit of weight and space imposed by fuel restrictions. Accordingly, a system for removing the water must ideally be both light weight and have a high adsorption capacity to volume ratio.

Particulate adsorbents such as kaolin, silica gel, anhydrous salts and molecular sieves, such as synthetic zeolites, can be used to adsorb contaminants from various fluid environments, e.g., water vapor in an atmospheric environment. Particulate adsorbents have a high surface area and can be selected for their high specific capacity for a particular contaminant. Particulate adsorbents such as synthetic zeolites also have a relatively low weight for a given volume of adsorbent. As such they are particularly applicable for use in aerospace where, as noted above, weight and volume are critical. However, direct contact of an adsorbent such as a synthetic zeolite with a contaminated liquid environment is often undesirable. For example, in the case of lubricating oil used in the aerospace industry, fine particles of the adsorbent may further contaminate the liquid and degrade mechanical components, requiring additional steps to remove the adsorbent particles. These lubricating systems, which are run at high revolutions per minute, generate an elevated level of vibration that in turn leads to the attrition of particulate adsorbents. Moreover, in the case of synthetic lubricating oils, adsorbents can remove beneficial oil additives—chemical additives in the oil intended to improve performance such as antioxidants, anti-wear agents and suspending agents—thus compromising oil performance. Direct contact of the adsorbent with the fluid is also inefficient since the capacity of the adsorbent is substantially reduced, and in some cases may be entirely lost.

Some of the problems associated with direct contact of adsorbents with the contaminated fluid may be overcome by separating the adsorbent from the fluid by means of a barrier. Prior art solutions have included fine mesh screens, fine denier fabrics and microporous membranes. While such porous physical barriers may prevent particles of the adsorbent from circulating in the fluid environment, they do not prevent the fluid environment from contacting the adsorbent. In addition, the barriers taught in the prior art do not prevent the migration of attrition particles into the bulk fluid, which may lead to fouling of the mechanical system components.

It is therefore desirable to provide a barrier which is permeable to contaminants in a fluid environment but not permeable to the bulk fluid. It is further desirable to use such a semipermeable barrier in conjunction with a particulate adsorbent for the removal of contaminants from fluid environments without necessitating further purification. Semipermeable, for purposes of this invention, is defined as a non-porous barrier that allows the passage of contaminants such as gases or water in a bulk fluid but is impermeable to the bulk fluid.

SUMMARY OF THE INVENTION

This invention provides a system which efficiently removes contaminants from a fluid environment. This invention also provides a system for removing contaminants in a fluid environment without significantly reducing other functional constituents of the fluid environment or adding particulate matter to the fluid environment. In addition, this invention provides a process for maintaining the selectivity and capacity of an adsorbent for a contaminant. The system enables one to optimize surface area of a particulate adsorbent yet avoid problems associated with the migration of attrition particles into the bulk fluid. This invention further provides a system for the removal of water present in concentrations from about 1500 ppm to about 100 ppm from lubricating oils, without reducing beneficial oil additives or adding particulate matter to the fluid environment. This invention still further provides a process for removing contaminants from fluid environments. Moreover this invention provides a process for reducing the level of water in lubricating oils to levels as low as 100 ppm and in some cases even lower, thereby inhibiting the corrosion of mechanical parts.

The system of this invention comprises a body of particulate adsorbent which removes (adsorbs) the contaminant and a non-porous polymeric film which is permeable to the contaminant and impermeable to the bulk fluid environment, selectively allowing passage of the contaminant. The adsorbent is selected for its high capacity for the contaminant. The semipermeable film or element is positioned and arranged to separate the body of adsorbent from the fluid thereby preventing direct contact of the adsorbent with the fluid environment and maintaining the adsorbent's high capacity for the contaminant. Particulate contamination of the fluid is also prevented as is the unwanted reduction of additive constituents of the fluid, which might otherwise occur when there is direct contact between the bulk fluid and the adsorbent. The adsorbent and semipermeable film are arranged to provide a light weight, low volume fluid clarification element, especially suitable for use in aerospace applications.

DESCRIPTION OF THE INVENTION

The system of this invention comprises a particulate adsorbent and a fluid barrier means comprising a thin non-porous film or sheet of polymeric material which is permeable to a specific contaminant of concern and impermeable to a bulk fluid environment. Polymers suitable in forming the non-porous film are those not permeable to the bulk fluid. If required, the film may be modified to enhance its permeability to the contaminant. The polymer must be chosen for its chemical compatibility and structural integrity with the bulk fluid environment as well as its impermeability to the bulk fluid. For instance, where the contaminant is water in a lubricating oil, the polymer of the barrier film must be chemically stable in and impermeable to the oil, and must be able to withstand operating temperatures up to 250° F. and higher. Specifically, it has been found that non-porous films consisting of perfluorinated polymers and co-polymers such as poly(chlorotrifluoroethylene-co-ethylene) (ECTFE-polymer), poly-[tetrafluoroethylene-co-perfluoro (alkylvinyl ether)](PFA), poly(tetrafluoroethylene-co-ethylene) (ETFE), poly(tetrafluoroethylene) (PTFE), and poly(tetrafluoroethylene-co-hexafluoropropylene) (FEP), are chemically stable in and impermeable to a variety of lubricating oils and exhibit high thermal stability. These polymers are commercially available from E.I. Du Pont de Nemours and Company (Du Pont) under the trademark TEFLON® PFA, for PFA; TEFZEL®, for ETFE; TEFLON® TFE, for PTFE; and TEFLON® FEP, for FEP, respectively. However, none of the films mentioned above has the required permeability to water. High water permeability is indeed required in aerospace applications since small low weight systems are essential. The high degree of permeability enables one to design a system that can keep surface area to a minimum. It has been discovered that non-porous films made of ECTFE-polymer, PFA, ETFE, PTFE, and FEP may be modified in order to exhibit the desired permeability characteristics for water. This may be accomplished by chemical modification of the film by such means as radiation grafting. Surprisingly, it has been found that modification with selected monomers converts these perfluorinated polymeric films to films with a high permeability for water while retaining their impermeability to lubricating oils and their high thermal and chemical stability.

In one embodiment of the invention the system is used for the removal of water present as a contaminant in lubricating oils at concentrations from about 1500 ppm to about 500 ppm or lower with reduction of the contaminant to levels as low as about 100 ppm or even lower. This system comprises a body of adsorbent and a semipermeable barrier film. In the preferred embodiment the semipermeable film comprises a thin sheet of non-porous perfluorinated polymer, such as PTFE, as a substrate that is modified by treatment with monomers, such as styrene, preferably in the presence of ionizing radiation, and subsequent exposure to chlorosulfonic acid. The process produces a modified non-porous film that has the unique property of being impermeable to lubricating oils while exhibiting a desirably high permeability to water. The water vapor transmission rate is measured by ASTM E96-90. Surprisingly this film has a critical wetting surface tension which renders it hydrophobic, i.e., the film naturally repels liquid water. Despite the hydrophobic nature of the film, water is efficiently transported through the film.

It is generally desirable that the modified films exhibit a certain minimum transmission rate for a particular contaminant, and high values are desired. Depending upon a given application, it has been discovered that modification of the films can be controlled, thereby enabling one skilled in the art to create modified films which exhibit a transmission rate specifically appropriate for a particular application. In one specific embodiment of the present invention, for the removal of water from lubricating oil, it is preferred that the film exhibit a transmission rate for water of greater than 10 grams/hour meter$^2$ mil (g/hr.m$^2$ mil) more preferably at least about 100 g/hr.m$^2$ mil, and preferably to about 1000 g/hr.m$^2$ mil.

Typically, the thickness of the PTFE film may range from about 0.1 mil (0.00254 mm) to about 10 mils (0.254 mm), preferably from about 1 mil (0.0254 mm) to about 5 mils (0.127 mm), most preferably about 2 mils (0.0508 mm). PTFE films suitable for modification for use in the present invention are commercially available and for example may be purchased from Chemical Fabrics Corporation under the trademark Chemfilm TM MR cast PTFE film.

The system of this invention preferably comprises the following elements: a container, whose boundaries are partially o wholly comprised of a semipermeable barrier film, as described above, an adsorbent filling the container, wherein said adsorbent filled container is placed in contact with a contaminated bulk fluid, and wherein the contaminant passes freely through the semipermeable film and is adsorbed by the adsorbent and wherein the bulk fluid does not pass through the semipermeable film.

The semipermeable barrier material may be used to make up part or all of a container which is filled with the adsorbent. Any shape of container may be used. The container should have sufficient surface area of the semipermeable barrier for transmission of the contaminant at the desired rate. Examples of containers include metal or thermoplastic housings with one or more ends or faces composed of the semipermeable barrier.

Alternatively, the films may be formed in situ by coating a porous structure, which includes a mechanical support structure that supports the semipermeable polymeric film. The porous structure is positioned between the semipermeable polymeric film and the body of adsorbent. The porous structure may include a wire or ceramic cloth, or porous metal or porous ceramic structures manufactured by a sintering process. Such configurations have increased resistance to collapse from high differential pressure, critical in many applications. Hydraulic systems utilized in aerospace, for example, may reach pressures of 10,000 psi.

For example, a porous metal tube such as S Series PSS ®, a porous stainless steel filter element sold by Pall Corporation, may have a non-porous perfluorinated polymer deposited on its outer surface through conventional means such as powder coating or electrodeposition. The polymeric film may then be modified as described above so as to exhibit enhanced permeability for a contaminant such as water, while maintaining impermeability for a bulk fluid such as lubricating oil. The tube can be filled with a particulate adsorbent having a high surface area thereby maximizing the adsorptive process of the system. It is also critical, for aerospace and other applications, that the adsorbent have a high gravimetric capacity for the contaminant, and a high packing density so as to minimize system volume requirements. A high packing density may also increase the collapse resistance of the container when subjected to high differential pressure, common in aerospace lubricating and hydraulic systems. As such, it is required that the contaminant removal system be able to sustain the high system pressure without deleterious effects.

In order to maximize the mechanical stability of such as system, it is desirable to use particulate adsorbents which can be packed firmly, or in high density, inside the system, at the time of assembly, such that the resulting system is impervious to high pressures and compressive forces.

Alternatively, the container may be made entirely of the barrier semipermeable film. In constructing such a container, the edges are sealed by any means known to those skilled in the art including ultrasonic welding, fusion bonding or the use of an adhesive. Any adhesive used must be compatible with the fluid environment.

The movement of the dissolved contaminant across the barrier is controlled by the permeability of the barrier. It has been discovered that filling the container with particulate adsorbent having a high capacity for the contaminant, even when present at low concentrations, creates a driving force across the barrier that facilitates removal of the contaminant from the bulk fluid. The container is filled with a particulate adsorbent which has been specifically selected to exhibit both a high adsorbent capacity for the target contaminant and the ability to adsorb a contaminant which is present at very low concentrations.

Examples of representative adsorbents suitable for removing contaminants include natural zeolites and molecular sieves (synthetic zeolites). Preferred for removing water from lubricating oil are synthetic zeolites commercially available having pore ratings of from about 3Å to about 5Å, i.e., they have pore sizes such that they absorb molecules having an effective diameter ranging from about 3Å to about 5Å. Synthetic zeolites most preferred for the removal of water from lubricating oil include UOP Molecular Sieves ®, commercially available from UOP; Davison Molecular Sieves, commercially available from W.R. Grace and Company; Natrasorb ®, commercially available from Multiform Desiccants Inc.; and Tri-Sorb ®, commercially available from Ingredient Technology Corp. In the preferred embodiment of the invention, for the removal of water from lubricating oil, a synthetic zeolite with a pore rating of about 4Å comprised of a crystalline sodium/aluminosilicate is utilized.

Synthetic zeolites have the added advantage of high gravimetric capacity and high packing density potential, which makes them especially useful for aerospace applications. The packing density of an adsorbent is determined by the geometric shape and size of the particles and therefore fine powders are preferred.

The particle size or particle size distribution of synthetic zeolites may be designated using any of several standardized measurements including the U.S. Standard Sieve Series, e.g., the particulate size (distribution) is measured by passing the material through a series of progressively tighter metal screens (see U.S. Pat. No. 4,613,369).

While the invention is susceptible to various modifications and alternative forms, certain specific embodiments thereof are described in the examples set forth below. It should be understood, however, that these examples are offered by way of illustration and not by way of limitation.

EXAMPLES

A method has been discovered for modifying non-porous perfluorinated polymeric films wherein the modified films retain their impermeability for oil yet exhibit the surprising ability to freely pass water. This modification is accomplished by a two step process including modifying the film with a mixture of styrene and divinyl benzene, while under exposure to high energy radiation, followed by exposure to chlorosulfonic acid. The sulfonated product films exhibit enhanced water permeability, as determined by the test method in the General Procedure directly below, while maintaining their impermeability to oil and their high temperature and chemical resistance.

General Procedure for Measuring Water Vapor Transmission Rate

All vapor transmission rates were determined utilizing "Standard Method B" (Water Method at 73.4° F.) published in ASTM E96-90. An A139 vapometer, commercially available from Thwing-Albert Instrument Company, is filled with deionized water to a depth of approximately 1.2 inches (3 cm). A 3 inch diameter disc of the film to be tested is placed over the opening of the vapometer. The film is sealed with the top ring of the vapometer by means of a rubber gasket. Once sealed, the vapometer is placed on an analytical balance in a dry box, i.e., a box with temperature maintained at approximately 71° F. (+/−1.5° F.) and relative humidity maintained at less than 2%. The vapometer is initially weighed on the balance and then at intervals over a 50 hour period. The box is continuously purged with dry air, and the humidity and temperature levels are monitored. The water vapor transmission rate of the film is then calculated based on the reduced weight of the vapometer.

EXAMPLE 1

Modification of PTFE Film

A 5 mil thick non-porous PTFE film in the form of a continuous roll, approximately 24 inch by 250 feet (61 cm by 76 meters) commercially available as Chemfilm TM from Chemical Fabrics Corporation was modified as follows. The roll was first soaked in a solution of methylene chloride containing 30 volume percent of styrene and 0.5 volume percent of divinyl benzene following which the roll was exposed to a $^{60}Co$ gamma radiation source at a dose rate of 6000 rad/hour for 150 hours for a total dose of 0.9 megarads. The roll was then washed with hot deionized water to remove any excess monomer and then sulfonated by contacting it with a solution of 3 weight percent chlorosulfonic acid in methylene chloride for about 3 hours under ambient conditions. Following sulfonation, the roll was washed in methanol, rinsed with deionized water and dried. Samples of the modified film were tested for their ability to freely pass water utilizing the General Procedure For Measuring Water Vapor Transmission Rate described above compared with samples of unmodified film. The modified film had a transmission rate for water Vapor of about 126.7 grams/hour meter: mil (g/hr.m$^2$ mil) to about 307 g/hr.m$^2$ mil as measured by the General Procedure described above. In contrast, the unmodified film had a transmission rate for water vapor of about 0.26 g/hr.m$^2$ mil to about 0.58 g/hr.m$^2$ mil.

In examples 2 and 3 below, test systems were constructed and run to demonstrate the ability of the system of this invention to remove water from lubricating oils under operating conditions. The water content was determined before, during, and at the conclusion of each experiment utilizing the sampling method described in the General Sampling Procedure For Karl Fischer Analysis below.

General Sampling Procedure for Karl Fischer Analysis

In order to determine the water content present in lubricating oil, in ppm, the following method is utilized. Approximately 25 ml of oil is removed from a sample port in the test system using a clean, dry 50 ml glass syringe. The oil is then transferred to a clean, dry glass sample bottle, that has been sealed with a crimp top rubber septum. The sample bottle is allowed to cool to ambient temperature in a desiccator. A 6–8 ml sample is removed from the bottle with a tared plastic syringe and needle. The syringe and needle are weighed and then the oil is injected into a Karl Fischer titrator for analysis.

EXAMPLE 2

A test system was constructed to demonstrate the usefulness of the present invention. The test system consisted of two stainless steel plates, each containing a cavity, the cavities in the two plates being separated in a fluid tight manner from each other by the modified film of this invention. One cavity, having dimensions of approximately 7.8 inch by 1.4 inch by 0.4 inch deep (20 cm by 3.5 cm by 1.1 cm deep), was filled with approximately 30 grams of a granular molecular sieve, Union Carbide Type 3A, purchased from Fluka Chemical Corporation. The molecular sieve utilized was designated a 3Å pore rated crystalline sodium potassium-/aluminosilicate described as being 1/16 inch diameter rod size, i.e., having a nominal aspect ratio of from about 2:1 to about 4:1. The second cavity, having dimensions of approximately 8 inches by 1.5 inches and 0.04 inches deep (20.3 cm by 2.9 cm by 0.1 cm deep) formed a channel through which the water contaminated oil was recirculated. An 8.3 inch by 1.8 inch (21 cm by 4.4 cm) rectangle of PTFE film modified as described above in Example 1 was between the two cavities. A reservoir of approximately 1 liter of Mobil Jet Oil II (U.S. military specification MIL-L-23699) synthetic ester based oil with an initial dissolved water content of about 976 ppm was continuously circulated through the jig at a rate of about 285 milliliters/minute at 250° F. The concentration of dissolved water in the oil was monitored as a function of time using the General Sampling Procedure For Karl Fischer Analysis as described above. An aliquot of oil was removed from the system in a sealed sample bottle. Samples were analyzed in a DL18 Karl Fischer Titrator manufactured by Mettler Instrumente AG. Multiple analyses were performed for each aliquot and the average reported. The results are shown in Table I below.

After 127.25 hours the oil flow was stopped and the oil allowed to cool. The test system was dismantled and the PTFE film and molecular sieve inspected. The film was found to be intact and the film was observed to be dry and free from oil on the side which had been facing the adsorbent bed, indicating no penetration of oil through the film. The molecular sieve was also observed to be dry with no oil residue.

TABLE I

| Time (hours) | Average Water Content (ppm) |
|---|---|
| Start | 976 |
| 1 | 795 |
| 2 | 768 |
| 3 | 754 |
| 21 | 572 |
| 25 | 512 |
| 45 | 381 |

TABLE I-continued

| Time (hours) | Average Water Content (ppm) |
|---|---|
| 52 | 329 |
| 69 | 251 |
| 75 | 209 |
| 93 | 174 |
| 100 | 165 |
| 107 | 93 |
| 125 | 122 |
| 127 | 110 |

Data from Table I clearly shows a rapid reduction of water concentration in the oil, which stabilizes at about 100 ppm. It is believed that 100 ppm represents the lower limit of the reliability of the sampling method and Karl Fischer analysis.

As noted above, careful examination of the film at the conclusion of the experiment showed the surface of the film facing the adsorbent bed to be dry and free from any oil. This indicates that, despite exposure to oil at 250° F. for almost 130 hours, the film remained impermeable to lubricating oil. In addition the data in the Table above indicate that the film was structurally and chemically stable in the operating temperature range of an integrated drive generator. The above data demonstrate that the system of this invention is capable of reducing the level of dissolved water in lubricating oil well below 200 ppm, indeed, the data in Table I and Table II suggest levels below 100 ppm.

EXAMPLE 3

A test system was prepared by filling a cylindrical tube (prepared from a 5 mil PTFE sheet, modified as described above in Example 1) having dimensions of about 3.3 inches (8.3 cm) long, and about 1.8 inches (4.5 cm) in diameter, with 45.5 grams of molecular sieve and sealing the tube in a fluid tight manner. The sieve utilized was purchased from UOP, and is designated UOP Molecular Sieve, having a 4Å pore rating. The sieve is comprised of sodium/aluminosilicate, and designated as a 14 by 30 mesh size according to the U.S. Standard Sieve Series.

This test system was used to adsorb water from 850 ml of Mobil Jet Oil II (U.S. military specification MIL-L-23699), a synthetic ester based oil, by placing the system in full contact with the oil in a sealed recirculating reservoir. Operating conditions of an integrated drive generator were simulated by a recirculating flow of the oil at a rate of about 1.7 gallons per minute at 250° F. A specifically contaminated sample was prepared by adding distilled water to the oil. The concentration of dissolved water in the oil was monitored as a function of time using the General Sampling Procedure described above. Aliquots of oil from the system where removed and placed in sealed sample bottles. A portion of each sample was analyzed in a AQ-100 Karl Fischer Titrator manufactured by Ericsen Instruments Corporation. Multiple analyses were performed for each aliquot and the average reported. The results are shown in Table II below. The water content in the oil at the beginning of the test was determined to be 1481 parts per million.

TABLE II

| Time (hours) | Average Water Content (ppm) |
|---|---|
| Start | 1481 |
| 1 | 1209 |
| 2 | 1205 |
| 4 | 1197 |
| 6 | 1051 |
| 24 | 895 |
| 55 | 716 |
| 144 | 184 |
| 171 | 137 |
| 216 | 158 |
| 288 | 94 |

As shown in Table II, the water contamination level in the oil was reduced from an initial level of 1481 parts per million to 94 parts per million after 288 hours. The above data indicate that the system of this invention efficiently and rapidly reduces the level of water present in lubricating oils at operating temperatures.

Although the present invention has been described in terms of particular embodiments, it is not limited to these embodiments. Alternative embodiments and modifications which would be encompassed by the invention may be made by those skilled in the art, particularly in light of the foregoing teachings. Therefore, the following claims are intended to cover any alternative embodiments, modifications, or equivalents which may be included within the spirit and scope of the inventions as defined by the claims.

What is claimed is:

1. A fluid clarification system which selectively removes a contaminant from a bulk fluid, the system comprising: a body of adsorbent which adsorbs the contaminant; and a semipermeable non-porous polymeric film that allows passage of the contaminant while being impermeable to and chemically stable in the bulk fluid, wherein the body of adsorbent and the semipermeable non-porous polymeric film are arranged to position the semipermeable non-porous polymeric film between the adsorbent and the bulk fluid, thereby preventing the adsorbent from contaminating the bulk fluid and maintaining the adsorbent's efficiency for the contaminant.

2. The fluid clarification system of claim 1 wherein the semipermeable non-porous polymeric film forms at least a part of a container for the body of adsorbent.

3. The fluid clarification system of claim 2 wherein the semipermeable non-porous polymeric film comprises a modified non-porous perfluorinated film.

4. The fluid clarification system of claim 3 wherein the modified non-porous perfluorinated film has been modified so that the film is permeable to water and impermeable to and chemically stable in a lubricating oil and wherein the adsorbent is a molecular sieve with a high affinity for water.

5. The fluid clarification system of claim 4 wherein the modified non-porous perfluorinated film has a water vapor transmission rate of at least about 10 grams/hour meter$^2$ mil.

6. The fluid clarification system of claim 5 wherein the modified non-porous perfluorinated film comprises PTFE which has been modified by treatment with a mixture of styrene and divinyl benzene in the presence of ionizing radiation and is then exposed to chlorosulfonic acid.

7. The fluid clarification system of claim 6 wherein the container is disposed in a fixed volume fluid reservoir.

8. The fluid clarification system of claim 2 wherein the semipermeable non-porous polymeric film forms the entire container for the body of adsorbent.

9. The fluid clarification system of claim 4 wherein the modified non-porous perfluorinated film has a water vapor transmission rate of at least about 100 grams/hour meter² mil.

10. A fluid clarification element which selectively removes a contaminant from a bulk fluid comprising: a body of adsorbent which adsorbs the contaminant; a semipermeable non-porous polymeric film that selectively allows passage of the contaminant while being impermeable to and chemically stable in the bulk fluid; and a porous structure, which comprises a mechanical support structure that supports the semipermeable non-porous polymeric film, positioned between the semipermeable non-porous polymeric film and the body of adsorbent; wherein the semipermeable polymeric film and the body of adsorbent are arranged to position the semipermeable non-porous polymeric film between the adsorbent and the bulk fluid, thereby preventing the adsorbent from contaminating the bulk fluid and maintaining the adsorbent's efficiency for the contaminant.

11. The fluid clarification element of claim 9 wherein the semipermeable non-porous polymeric film comprises a modified non-porous perfluorinated film.

12. The fluid clarification element of claim 11 wherein the modified non-porous perfluorinated film has been modified so that the film is permeable to water and impermeable to and chemically stable in a lubricating oil and wherein the adsorbent is a molecular sieve with a high affinity for water.

13. The fluid clarification element of claim 12 wherein the modified non-porous perfluorinated film has a water vapor transmission rate of greater than 10 grams/hour meter² mil.

14. The fluid clarification element of claim 13 wherein the modified non-porous perfluorinated film comprises PTFE which has been modified by treatment with a mixture of styrene and divinyl benzene the presence of ionizing radiation and is then exposed to chlorosulfonic acid.

15. The fluid clarification element of claim 12 wherein the modified non-porous perfluorinated film has a water vapor transmission rate of greater than 100 grams/hour meter² mil.

16. The fluid clarification element of claim 10 wherein the porous structure forms the entire container for the body of adsorbent.

17. The fluid clarification element of claim 10 wherein the semipermeable non-porous polymeric film is formed in situ on a porous sintered metal powder element.

18. The fluid clarification element of claim 10 wherein the porous structure forms at least a part of a container for the body of adsorbent.

19. A process for removing a contaminant from a bulk fluid comprising the steps of:

a) contacting the contaminated fluid with a semipermeable non-porous polymeric film that alllows passage of the contaminant therethrough and is impermeable to the bulk fluid, and b) adsorbing the contaminant in an adsorbent material which is separated from the bulk fluid by the semipermeable non-porous polymeric film.

20. The process of claim 19 wherein the contaminant comprises water and wherein the semipermeable non-porous polymeric film comprises a modified non-porous perfluorinated film that allows the passage of water therethrough.

21. The process of claim 20 wherein the modified non-porous perfluorinated film has been modified so that the film is impermeable to and chemically stable in a lubricating oil and wherein the adsorbent is a molecular sieve with a high affinity for water.

22. The process of claim 21 wherein the modified non-porous perfluorinated film has a water vapor transmission rate of greater than 100 grams/hour meter² mil.

23. The process of claim 21 wherein the modified non-porous perfluorinated film has a water vapor transmission rate of greater than 10 grams/hour meter² mil.

24. The process of claim 23 wherein the modified non-porous perfluorinated film comprises PTFE which has been modified by treatment with a mixture of styrene and divinyl benzene in the presence of ionizing radiation and is then exposed to chlorosulfonic acid.

25. The process of claim 24 wherein the contaminated fluid is a lubricating oil and wherein the concentration of water in the lubricating oil is reduced to about 200 ppm or less.

26. The process of claim 25 wherein the concentration of water in the lubricating oil is reduced to about 100 ppm or less.

27. The process of claim 19 wherein the semipermeable polymeric film forms at least a part of a container for the body of adsorbent.

28. An adsorption system which selectively removes a contaminant from a bulk fluid, the system comprising:

a body of adsorbent which adsorbs the contaminant;

a semipermeable non-porous element which allows passage of the contaminant therethrough while being impermeable to the bulk fluid; and wherein the semipermeable non-porous element is positioned to separate the body of adsorbent from the bulk fluid.

29. A method for removing a contaminant from a bulk fluid comprising the steps of:

a) contacting the contaminated fluid with a semipermeable non-porous element which allows passage of the contaminant therethrough while being impermeable to the bulk fluid, b) passing the contaminant through the semipermeable non-porous element and, c) adsorbing the passed contaminant in an adsorbent.

* * * * *